(12) United States Patent
Yamamoto et al.

(10) Patent No.: US 11,161,170 B2
(45) Date of Patent: Nov. 2, 2021

(54) CONTROL METHOD, DEVICE, AND PROGRAM OF CONTINUOUS CASTING PROCESS OF MULTILAYERED SLAB

(71) Applicant: NIPPON STEEL CORPORATION, Tokyo (JP)

(72) Inventors: Hiroki Yamamoto, Tokyo (JP); Hiroshi Kitada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/055,834

(22) PCT Filed: Jun. 7, 2019

(86) PCT No.: PCT/JP2019/022666
§ 371 (c)(1),
(2) Date: Nov. 16, 2020

(87) PCT Pub. No.: WO2019/235601
PCT Pub. Date: Dec. 12, 2019

(65) Prior Publication Data
US 2021/0107057 A1  Apr. 15, 2021

(30) Foreign Application Priority Data
Jun. 8, 2018  (JP) .............................. JP2018-110356

(51) Int. Cl.
*B22D 11/103* (2006.01)
*B22D 11/18* (2006.01)
*B22D 11/115* (2006.01)

(52) U.S. Cl.
CPC .......... *B22D 11/103* (2013.01); *B22D 11/181* (2013.01); *B22D 11/115* (2013.01)

(58) Field of Classification Search
CPC ....... B22D 11/007; B22D 11/16; B22D 11/18; B22D 11/181; B22D 11/185;
(Continued)

(56) References Cited

U.S. PATENT DOCUMENTS 4,828,015 A    5/1989  Takeuchi et al.

FOREIGN PATENT DOCUMENTS

JP    56-153406 A    11/1981
JP    63-108947 A    5/1988
(Continued)

OTHER PUBLICATIONS

Ikeda et al., "Multivariable system control", Corona Publishing Co., Ltd., p. 95, 2010.
(Continued)

*Primary Examiner* — Kevin P Kerns
*Assistant Examiner* — Steven S Ha
(74) *Attorney, Agent, or Firm* — Birch, Stewart, Kolasch & Birch, LLP

(57) ABSTRACT

A control method of a continuous casting process is a method that injects molten metal from a surface layer nozzle and an inner layer nozzle into a mold and separates the molten metal of a surface layer and the molten metal of an inner layer, the control method including, using a molten metal level meter that measures a surface layer level and a flowmeter that measures a supply flow rate of the molten metal, estimating a boundary layer level on the basis of a measured value of the surface layer level, a measured value of the supply flow rate of the molten metal, and a calculated value of the supply flow rate of the molten metal, and controlling the supply flow rate of the molten metal of the surface layer nozzle and the supply flow rate of the molten metal of the inner layer nozzle.

8 Claims, 6 Drawing Sheets

(58) Field of Classification Search
CPC ..... B22D 11/188; B22D 11/20; B22D 11/201; B22D 11/204; B22D 11/207
See application file for complete search history.

(56) References Cited

FOREIGN PATENT DOCUMENTS

| | | |
|---|---|---|
| JP | 63-298609 A | 12/1988 |
| JP | 3-243262 A | 10/1991 |
| JP | 5-23811 A | 2/1993 |
| JP | 5-104223 A | 4/1993 |
| JP | 6-292945 A | 10/1994 |
| JP | 9-262653 A | 10/1997 |
| JP | 2001-296903 A | 10/2001 |
| JP | 2002-248555 A | 9/2002 |

OTHER PUBLICATIONS

Takeuchi et al., "Novel continuous casting process for clad steel slabs with level dc magnetic field", Ironmaking and Steelmaking, 1997, vol. 24, No. 3, pp. 257-263.

CONTROL METHOD, DEVICE, AND PROGRAM OF CONTINUOUS CASTING PROCESS OF MULTILAYERED SLAB

TECHNICAL FIELD OF THE INVENTION

The present invention relates to a control method, a device, and a program of a continuous casting process of a multilayered slab.

The present application claims priority based on Japanese Patent Application No. 2018-110356 filed in Japan on Jun. 8, 2018, and the content thereof is incorporated herein.

RELATED ART

Conventionally, a multilayered slab in which composition of a surface layer and composition of an inner layer are different from each other has been manufactured. For example, Patent Document 1 discloses a configuration in which molten metals of different compositions in a mold are separated by a magnetic means and the molten metals of different compositions are supplied above and below a boundary. More specifically, a static magnetic field band is formed between a relatively upper molten metal supply position and a relatively lower molten metal supply position in the mold so that a magnetic line extends in a direction perpendicular to a casting direction, thereby preventing mixing of the molten metals of different compositions in different supply positions.

In the continuous casting process of the multilayered slab, in order to keep a position of the boundary that separates the molten metal (molten steel) of the surface layer and the molten steel of the inner layer vertically (hereinafter, referred to as a boundary layer level) in the static magnetic field band, it is necessary to appropriately control a molten steel supply flow rate by an immersion nozzle for the surface layer and a molten steel supply flow rate by an immersion nozzle for the inner layer.

For this problem, Patent Document 2 discloses, for example, a method of controlling a mold molten metal level by injection amount sum operation while keeping a ratio of an inner layer molten steel injection amount and an outer layer molten steel injection amount constant.

Patent Document 3 discloses a method of comparing a surface layer injection amount measured by an electromagnetic flowmeter mounted on an injection nozzle on a surface layer tundish side and a surface layer injection amount set value obtained by calculating a set value using a surface layer shell thickness and a casting speed and adjusting the surface layer injection amount by opening and closing a stopper of a surface layer injection nozzle such that both coincide with each other, and comparing a molten metal level detected by a molten metal level meter and a molten metal level set value obtained by calculating a set value using the surface layer shell thickness and the casting speed and adjusting an inner layer injection amount by opening and closing a stopper of an inner layer injection nozzle such that both coincide with each other.

CITATION LIST

Patent Document

[Patent Document 1]
Japanese Unexamined Patent Application, First Publication No. S63-108947

[Patent Document 2]
Japanese Unexamined Patent Application, First Publication No. H3-243262

[Patent Document 3]
Japanese Unexamined Patent Application, First Publication No. H5-104223

Non-Patent Document

[Non-Patent Document 1]
Ironmaking & Steelmaking 1997 Vol. 24 No. 3 "Novel continuous casting process for clad steel slabs with level d magnetic field"

[Non-Patent Document 2]
Ikeda and Fujisaki, "Multivariable System Control", CORONA PUBLISHING CO., LTD., p. 95

SUMMARY OF INVENTION

Problems to be Solved by the Invention

However, none of the conventional methods directly controls the boundary layer level. Therefore, for example, in a case where fluctuation occurs in the boundary layer level due to fluctuation in the molten steel injection amount associated with a change in flow rate characteristic such as nozzle clogging, clogging removal and the like during casting, it takes a long time to recover this to a target value, and in the meantime, the molten steel in the surface layer and the molten steel in the inner layer might be mixed with each other causing deterioration of the quality of the multilayered slab.

The present invention is achieved in view of the above-described points, and an object thereof is to control the boundary layer level with a high degree of accuracy in the continuous casting process of the multilayered slab.

Means for Solving the Problem

The gist of the present invention for solving the above-described problem is as follows.

(1) A first aspect of the present invention is a control method of a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the control method of a continuous casting process of a multilayered slab including using a molten metal level meter that measures a surface layer level that is a position of a molten metal level in the mold, and a flowmeter that measures a supply flow rate of the molten metal installed in any one of the surface layer nozzle and the inner layer nozzle, estimating a boundary layer level that is a position of the boundary by an observer on the basis of a measured value of the surface layer level by the molten metal level meter, a measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed, and controlling the supply flow rate of the molten metal of the surface layer nozzle and the supply flow rate of the molten metal of the inner layer nozzle so as to keep the measured value of the surface layer level by the molten metal level meter and an estimated value of the boundary layer level by the observer to target values, respectively.

(2) In the control method of a continuous casting process of a multilayered slab according to (1) described above, a Luenberger-type observer may be configured by using a linear approximation model of the continuous casting process of the multilayered slab as the observer.

(3) In the control method of a continuous casting process of a multilayered slab according to (1) or (2) described above, the observer may make the surface layer level, the boundary layer level, and disturbance corresponding to a calculation error of the calculated value of the supply flow rate of the molten metal of one of the surface layer nozzle and the inner layer nozzle in which the flowmeter is not installed state variables.

(4) In the control method of a continuous casting process of a multilayered slab according to (3) described above, step disturbance or ramp disturbance may be given as the disturbance.

(5) In the control method of a continuous casting process of a multilayered slab according to any one of (1) to (4) described above, the flowmeter may be installed in the inner layer nozzle.

(6) In the control method of a continuous casting process of a multilayered slab according to any one of (1) to (4) described above, the flowmeter may be installed in the surface layer nozzle.

(7) A second aspect of the present invention is a control device that controls a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the control device of a continuous casting process of a multilayered slab provided with an inputter that inputs a measured value of a surface layer level that is a position of a molten metal level in the mold by a molten metal level meter, and a measured value of a supply flow rate of the molten metal by a flowmeter installed in any one of the surface layer nozzle and the inner layer nozzle, an estimator that estimates a boundary layer level that is a position of the boundary by an observer on the basis of a measured value of the surface layer level by the molten metal level meter, a measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed, and a controller that controls the supply flow rate of the molten metal of the surface layer nozzle and the supply flow rate of the molten metal of the inner layer nozzle so as to keep the measured value of the surface layer level by the molten metal level meter and an estimated value of the boundary layer level by the estimator to target values, respectively.

(8) A third aspect of the present invention is a program for controlling a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the program configured to allow a computer to execute inputting a measured value of a surface layer level that is a position of a molten metal level in the mold by a molten metal level meter, and a measured value of a supply flow rate of the molten metal by a flowmeter installed in any one of the surface layer nozzle and the inner layer nozzle, estimating a boundary layer level that is a position of the boundary by an observer on the basis of the measured value of the surface layer level by the molten metal level meter, the measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed, and controlling the supply flow rate of the molten metal of the surface layer nozzle and the supply flow rate of the molten metal of the inner layer nozzle so as to keep the measured value of the surface layer level by the molten metal level meter and an estimated value of the boundary layer level by the estimation to target values, respectively.

Effects of the Invention

According to the present invention, a boundary layer level may be controlled with a high degree of accuracy in a continuous casting process of a multilayered slab. As a result, it becomes possible to suppress mixing of molten metal of a surface layer and molten metal of an inner layer, thereby manufacturing a multilayered slab with excellent quality.

EMBODIMENT OF THE INVENTION

Hereinafter, a preferred embodiment of the present invention is described with reference to the accompanying drawings.

Figure 1:
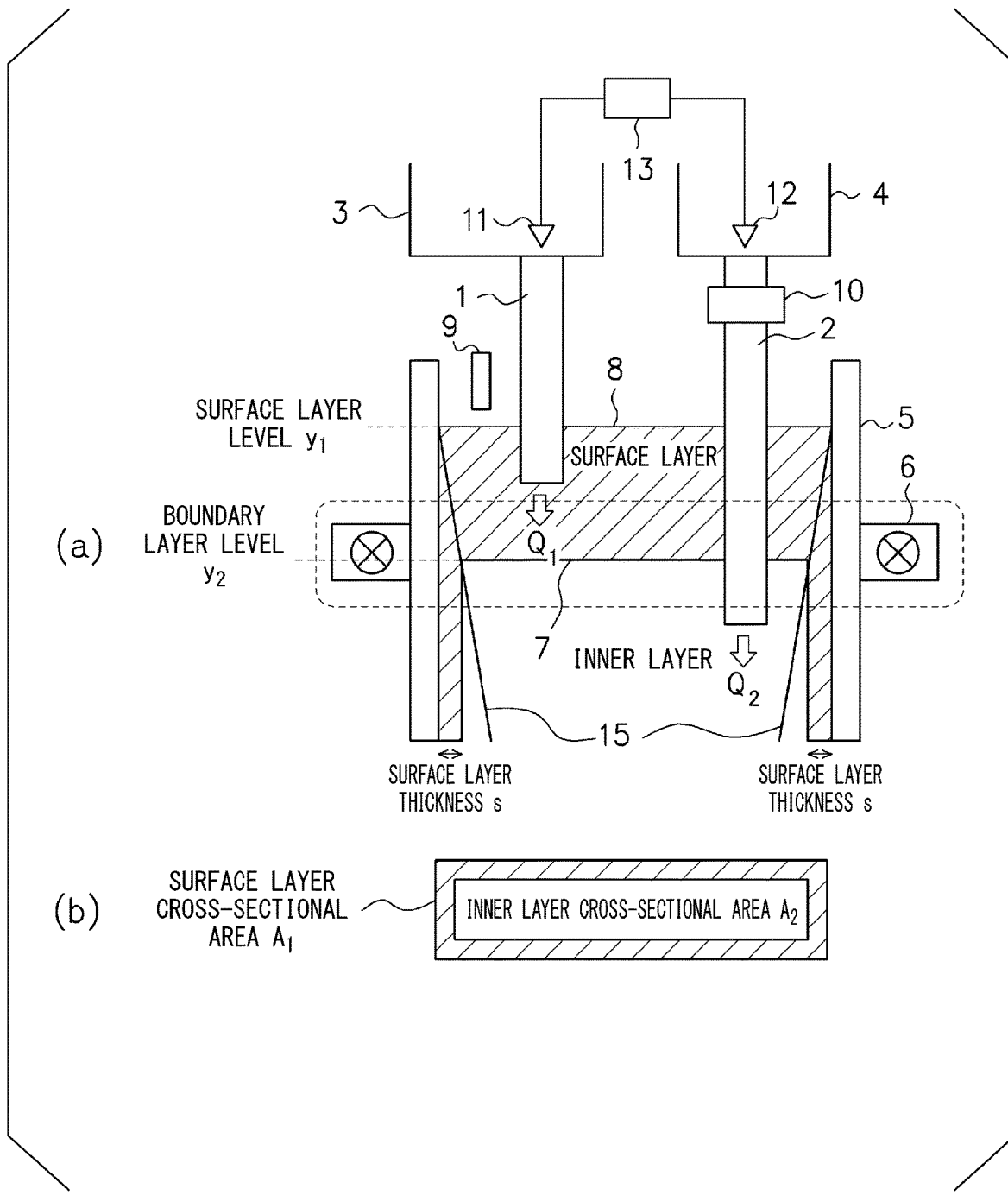
FIG. 1 is a view illustrating an outline of continuous casting equipment for casting a multilayered slab.

FIG. 1 illustrates an outline of continuous casting equipment for casting a multilayered slab.

As illustrated in (a) of FIG. 1, the continuous casting equipment is provided with two immersion nozzles with different discharge positions in a casting direction (hereinafter, referred to as a surface (outer) layer nozzle 1 and an inner layer nozzle 2), and molten steels with different compositions are injected from a surface layer tundish 3 and an inner layer tundish 4 into a mold 5 through the surface layer nozzle 1 and the inner layer nozzle 2, respectively. (b) of FIG. 1 is a schematic diagram illustrating a surface layer cross-sectional area $A_1$ and an inner layer cross-sectional area $A_2$.

Each molten steel injected into the mold 5 is subjected to a braking force in a static magnetic field band formed by a magnetic field generation device 6, and the molten steel of a surface layer and the molten steel of an inner layer are separated vertically across a boundary 7 in the mold 5. A molten metal level 8 in the mold 5 is a position where the molten steel of the surface layer comes into contact with molten powder, and the boundary 7 is a position where the molten steel of the surface layer separates from the molten steel of the inner layer. Hereinafter, a position of the molten metal level 8 is referred to as a surface layer level, and a position of the boundary 7 is referred to as a boundary layer level. Note that, although the boundary 7 is actually formed as a transition layer between both the layers, this is treated as a boundary line. Note that, a line 15 indicates a solidification shell position.

A molten metal level meter 9 for measuring the surface layer level in the mold 5 is installed. An in-nozzle flowmeter (hereinafter, simply referred to as a flowmeter) 10 for measuring a molten steel supply flow rate is installed in any one of the surface layer nozzle 1 and the inner layer nozzle 2. The flowmeter 10 is installed in only the inner layer nozzle 2 in this embodiment. Note that, no flowmeter is installed in the other of the surface layer nozzle 1 and the inner layer nozzle 2. No flowmeter 10 is installed in the surface layer nozzle 1 in this embodiment. As the flowmeter 10, for example, an electromagnetic flowmeter is used. In a case where the electromagnetic flowmeter is used, it is desirable that the immersion nozzle be filled with the molten steel, so that the flowmeter 10 is installed in the inner layer nozzle 2 with a relatively large flow rate in this embodiment.

The molten steel supply flow rate by the surface layer nozzle 1 (hereinafter, referred to as a surface layer flow rate) is adjusted by opening/closing of a surface layer stopper 11. Similarly, the molten steel supply flow rate by the inner layer nozzle 2 (hereinafter, referred to as an inner layer flow rate) is adjusted by opening/closing of an inner layer stopper 12. Opening/closing operation of these stoppers 11 and 12 is executed under the control of a controller 13. Note that, although the stopper (hereinafter, also referred to as ST) is used in this embodiment, it is also possible to configure such that a sliding nozzle is used to adjust the molten steel supply flow rate from each of the nozzles 1 and 2.

In a continuous casting process of the multilayered slab by the continuous casting equipment as described above, it is necessary to appropriately control the surface layer flow rate and the inner layer flow rate in order to keep the surface layer level and the boundary layer level at appropriate positions.

Figure 2:
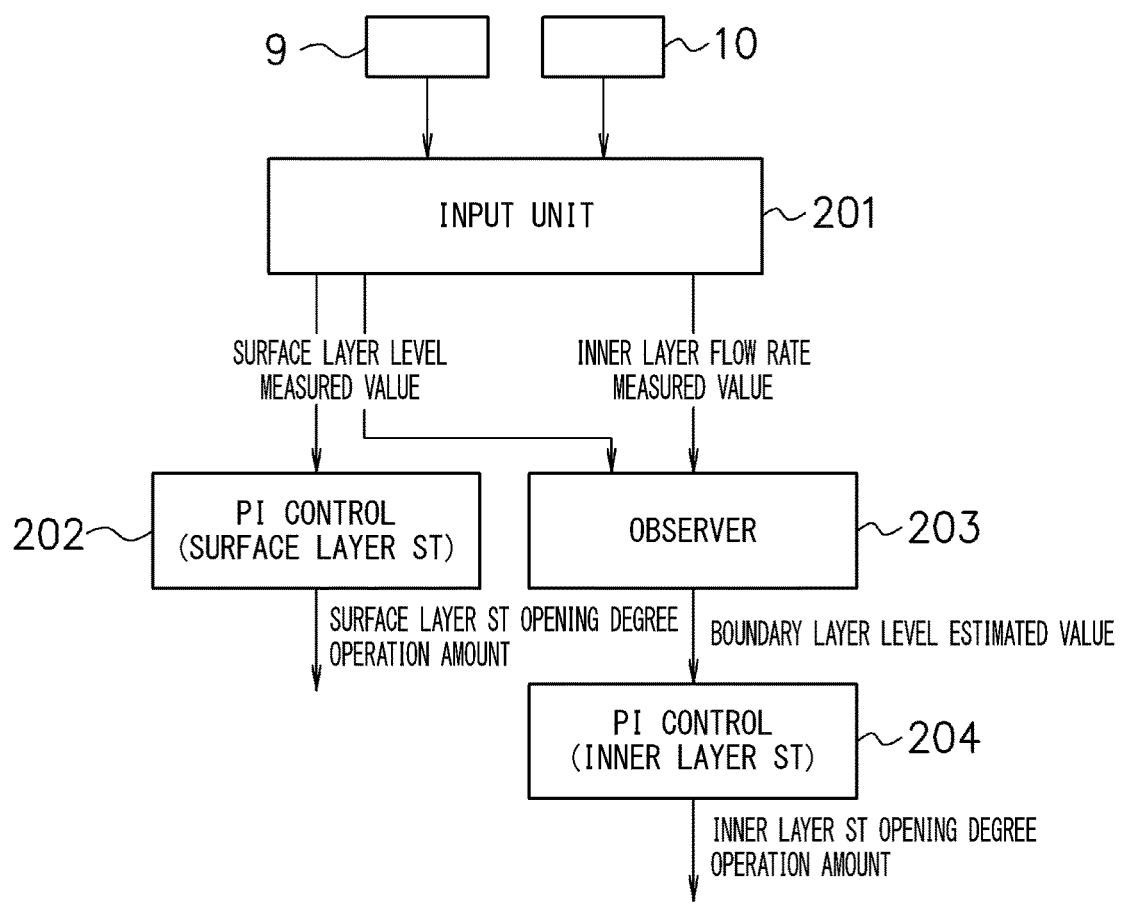
FIG. 2 is a view illustrating a functional configuration of a control device of a continuous casting process of the multilayered slab in an embodiment.

With reference to FIG. 2, a functional configuration of the controller 13 that serves as a control device of the continuous casting process of the multilayered slab in this embodiment is described.

An input unit 201 inputs a measured value of the surface layer level by the molten metal level meter 9 and a measured value of the inner layer flow rate by the flowmeter 10.

A control unit 202 determines an opening degree operation amount of the surface layer stopper 11 by Proportional Integral control (PI control) so that the measured value of the surface layer level by the molten metal level meter 9 is kept at a surface layer level target value, thereby controlling the surface layer flow rate.

A Luenberger-type observer (state observer) is configured by using a linear approximation model of the continuous casting process of the multilayered slab. An estimation unit 203 estimates the boundary layer level by the observer on the basis of the measured value of the surface layer level by the molten metal level meter 9, the measured value of the inner layer flow rate by the flowmeter 10, and further a calculated value of the surface layer flow rate that is a molten steel supply flow rate of the immersion nozzle without the flowmeter installed. Then, a control unit 204 determines an opening degree operation amount of the inner layer stopper 12 by the PI control so as to keep an estimated value of the boundary layer level by the estimation unit 203 at a boundary layer level target value, thereby controlling the inner layer flow rate. Note that, when estimating a state variable, a nonlinear filtering method for a nonlinear model (ensemble Kalman filter and the like) may be used without using the linear approximation model, but in this embodiment, a case where the Luenberger-type observer is configured by using the linear approximation model of the continuous casting process of the multilayered slab is described.

Note that, in this embodiment, the input unit 201 corresponds to an inputter in the present invention, the estimation unit 203 corresponds to an estimator in the present invention, and the control units 202 and 204 correspond to a controller in the present invention.

<Formulation of Continuous Casting Process of Multilayered Slab>

A model expressing the continuous casting process of the multilayered slab is disclosed in, for example, Patent Document 3 and Non-Patent Document 1.

In this model, a meniscus position (surface layer level) $y_1(t)$ and a boundary layer level $y_2(t)$ fluctuate according to equations (1) to (5) depending on fluctuations of a surface layer flow rate $Q_1(t)$ and an inner layer flow rate $Q_2(t)$. As illustrated in FIG. 1, s(t) represents a surface layer thickness of the multilayered slab, $A_1(t)$ represents a surface layer cross-sectional area of the multilayered slab, $A_2(t)$ represents an inner layer cross-sectional area of the multilayered slab, and A represents a total cross-sectional area $(A_1(t)+A_2(t))$ of the multilayered slab. $V_c$ represents a casting speed. W represents a mold width, D represents a mold thickness, and K represents a solidification coefficient.

In the continuous casting process of the multilayered slab, the surface layer thickness s(t) and the boundary layer level $y_2(t)$ have a function of "self-repairing" with the fluctuations of the surface layer level $y_1(t)$ and the boundary layer level $y_2(t)$.

Here, the inner layer cross-sectional area $A_2(t)$ and the surface layer thickness s(t) fluctuate according to equations (3) and (4). τ represents a dead time until extraction from the meniscus position to the boundary layer level and satisfies equation (5).

[Mathematical Expression 1]

$$\frac{dy_1}{dt} = \frac{Q_1(t) + Q_2(t)}{A} - V_c \tag{1}$$

-continued $$\frac{dy_2}{dt} = \frac{Q_2(t)}{A_2(t)} - V_c \quad (2)$$

$$A_2(t) = (W - 2s(t))(D - 2s(t)) \quad (3)$$

$$s(t) = K\sqrt{\tau} \quad (4)$$

$$y_2(t) = y_1(t - \tau) - \int_{t-\tau}^{t} V_c(t')dt' \quad (5)$$

If the casting speed $V_c$ is constant, the dead time T may be expressed by equation (6). Furthermore, if the surface layer level is kept at the surface layer level target value, the dead time t may be approximated as in equation (7). $y_0$ represents a steady surface layer level target value. During steady control, the approximation as in equation (7) may be performed.

[Mathematical Expression 2]

$$\frac{y_1(t - \tau) - y_2(t)}{V_c} = \tau \quad (6)$$

$$\frac{y_1(t - \tau) - y_2(t)}{V_c} \approx \frac{y_0 - y_2(t)}{V_c} = \tau \quad (7)$$

<Derivation of Linear Approximation Model>

In order to configure the Luenberger-type observer, a linear approximation model of a nonlinear model of equations (1) to (4) and (7) is derived.

Perturbation amounts ($y_1\tilde{}(t)$, $y_2\tilde{}(t)$, $s\tilde{}(t)$, $A_2\tilde{}(t)$, $Q_1\tilde{}(t)$, $Q_2\tilde{}(t)$) of respective state variables in the vicinity of set values are defined as follows. Note that, for example, in the notation of $y_1\tilde{}(t)$, $\tilde{}$ is superscript of $y_1$.

$$y_1(t) = y_1^* + \tilde{y}_1(t)$$

$$y_2(t) = y_2^* + \tilde{y}_2(t)$$

$$s(t) = s^* + \tilde{s}(t)$$

$$A_2(t) = A_2^* + \tilde{A}_2(t)$$

$$Q_1(t) = Q_1^* + \tilde{Q}_1(t)$$

$$Q_2(t) = Q_2^* + \tilde{Q}_2(t) \quad \text{[Mathematical Expression 3]}$$

$y_1^*$ and $y_2^*$ represent set values of the surface layer level and the boundary layer level, respectively, $s^*$ and $A_2^*$ represent equilibrium points of the nonlinear model determined according to $V_c$, $y_1^*$, and $y_2^*$, and $Q_1^*$ and $Q_2^*$ represent target values of the molten steel supply flow rates determined according to $V_c$, $s^*$, and $A_2^*$; they are expressed as follows.

$y_1^*, y_2^*$:(set values)   [Mathematical Expression 4]

$$s^* = K\sqrt{\frac{y_1^* - y_2^*}{V_c}}$$

$$A_2^* = (W - 2s^*)(D - 2s^*)$$

$$A_1^* = A - A_2^*$$

$$Q_1^* = A_1^* V_c$$

$$Q_2^* = A_2^* V_c$$

By linearly approximating the nonlinear model of equations (1) to (4) and (7) in the vicinity of the set values, perturbation dynamics of the surface layer level and boundary layer level are expressed by equations (8) and (9).

[Mathematical Expression 5]

$$\frac{d\tilde{y}_1(t)}{dt} = \frac{\tilde{Q}_1(t) + \tilde{Q}_2(t)}{A} \quad (8)$$

$$\frac{d\tilde{y}_2(t)}{dt} = \alpha\tilde{s}(t) + \frac{\tilde{Q}_2(t)}{A_2^*} \quad (9)$$

$$\alpha = \frac{2V_c}{A_2^*}\{(W - 2s^*) + (D - 2s^*)\} \quad (10)$$

Note that, the perturbation amount $s\tilde{}(t)$ of the surface layer thickness is expressed by equation (12), and it is understood that the perturbation amount $s\tilde{}(t)$ of the surface layer thickness fluctuates so as to go against the fluctuation of the perturbation amount $y_2\tilde{}(t)$ of the boundary layer level.

[Mathmatical Expression 6]

$$s(t) = K\sqrt{\frac{y_1^* - y_2(t)}{V_c}} = K\sqrt{\frac{y_1^* - y_2^*}{V_c}} + \tilde{s}(t) \quad (11)$$

$$\tilde{s}(t) = -\beta\tilde{y}_2(t) \quad (12)$$

$$\beta = \frac{1}{2}\sqrt{\frac{K}{V_c(y_1^* - y_2^*)}} \quad (13)$$

Equation (9) expressing the fluctuation of the boundary layer level may be summarized as equation (14) by using equations (10) to (13).

[Mathematical Expression 7]

$$\frac{d\tilde{y}_2(t)}{dt} = -\alpha\beta\tilde{y}_2(t) + \frac{\tilde{Q}_2(t)}{A_2^*} \quad (14)$$

Note that, when a casting speed $V_c$=1.0 m/min, a solidification coefficient K=20.0 mm·min^(-½), a surface layer level $y_1$=−100 mm, and a boundary layer level $y_2$=−420 mm, α=0.4735 and β=0.0177 are satisfied, and a time constant "1/αβ" of a self-repairing function of the boundary layer level is 117 sec.

<Observer Configuration>

The Luenberger-type observer is configured to estimate the boundary layer level that cannot be measured directly.

Herein, as the input of the observer, the two flow rates of the surface layer flow rate and the inner layer flow rate are required, but since only one flowmeter 10 is installed, the surface layer flow rate being the molten steel supply flow rate of the immersion nozzle without the flowmeter installed is substituted by the calculated value, and a calculation error is regarded as step disturbance to be compensated by the observer.

As the calculated value of the surface layer flow rate, for example, a flow rate target value during the steady control (a constant value determined according to the casting speed) may be used, or a value calculated on the basis of a nominal model of a flow rate characteristic indicating a relationship between an opening degree of the surface layer stopper 11 and the flow rate and an opening degree result value of the surface layer stopper 11 may be used.

In a case where the flowmeter 10 is installed in the inner layer nozzle 2 and the flowmeter is not installed in the surface layer nozzle 1 as in this embodiment, formulation thereof is as follows.

It is formulated by a state space model (equations (15) to (17)) while taking into consideration a step disturbance $d_1\hat{}(t)$ as a calculation error of a calculated value $Q_1\tilde{}(t)$ of the surface layer flow rate. Equation (15) is obtained by adding the step disturbance $d_1\hat{}(t)$ to equation (8), and equation (16) corresponds to equation (14). Note that, $\hat{}$ is assigned to distinguish that this is the state variable of the observer, and for example, in the notation of $d_1\hat{}(t)$, $\hat{}$ is superscript of $d_1$.

Equations (15) to (17) may be summarized to be expressed by a state space model of equations (18) and (19).

[Mathematical Expression 8]

$$\frac{d\tilde{y}_1(t)}{dt} = \frac{(\tilde{Q}_1(t) + \hat{d}_1(t)) + \tilde{Q}_2(t)}{A} \quad (15)$$

$$\frac{d\tilde{y}_2(t)}{dt} = -\alpha\beta \tilde{y}_2(t) + \frac{\tilde{Q}_2(t)}{A_2^*} \quad (16)$$

$$\frac{d\hat{d}_1(t)}{dt} = 0 \quad (17)$$

$$\frac{d}{dt}\begin{pmatrix}\hat{y}_1(t)\\\hat{y}_2(t)\\\hat{d}_1(t)\end{pmatrix} = \begin{pmatrix}0 & 0 & 1/A\\0 & -\alpha\beta & 0\\0 & 0 & 0\end{pmatrix}\begin{pmatrix}\hat{y}_1(t)\\\hat{y}_2(t)\\\hat{d}_1(t)\end{pmatrix} + \begin{pmatrix}1/A & 1/A\\0 & 1/A_2^*\\0 & 0\end{pmatrix}\begin{pmatrix}\tilde{Q}_1(t)\\\tilde{Q}_2(t)\end{pmatrix} \quad (18)$$

$$y(t) = (1 \ 0 \ 0)\begin{pmatrix}\hat{y}_1(t)\\\hat{y}_2(t)\\\hat{d}_1(t)\end{pmatrix} \quad (19)$$

For this state space model, the observer is configured as equation (20).

[Mathematical Expression 9]

$$\frac{d}{dt}\begin{pmatrix}\hat{y}_1(t)\\\hat{y}_2(t)\\\hat{d}_1(t)\end{pmatrix} = \quad (20)$$

$$\begin{pmatrix}-L_1 & 0 & 1/A\\-L_2 & -\alpha\beta & 0\\-L_3 & 0 & 0\end{pmatrix}\begin{pmatrix}\hat{y}_1(t)\\\hat{y}_2(t)\\\hat{d}_1(t)\end{pmatrix} + \begin{pmatrix}L_1\\L_2\\L_3\end{pmatrix}y(t) + \begin{pmatrix}1/A & 1/A\\0 & 1/A_p^*\\0 & 0\end{pmatrix}\begin{pmatrix}\tilde{Q}_1(t)\\\tilde{Q}_2(t)\end{pmatrix}$$

In a case where the state space model is detectable, an estimation error of the state variable by the observer decreases with time and approaches 0 (refer to Non-Patent Document 2, for example). Here, the fact that the state space model is detectable means that a condition of equation (23) is satisfied for an unstable pole $\lambda$ of a system matrix A of equations (21) and (22). n represents a dimension of a state variable x.

In the state space model of equations (18) and (19), equation (24) is obtained for an unstable pole 0 and detectability is satisfied, so that the estimation error of the observer configured by equation (20) may asymptotically approach 0.

[Mathematical Expression 10]

$$\frac{dx}{dt} = Ax + Bu, \quad (21)$$

$$y = Cx \quad (22)$$

$$\text{rank}\begin{pmatrix}A - \lambda I\\C\end{pmatrix} = n \quad (23)$$

$$\text{rank}\begin{pmatrix}0 & 0 & 1/A\\0 & -\alpha\beta & 0\\0 & 0 & 0\\1 & 0 & 0\end{pmatrix} = 3 \quad (24)$$

Figure 3:
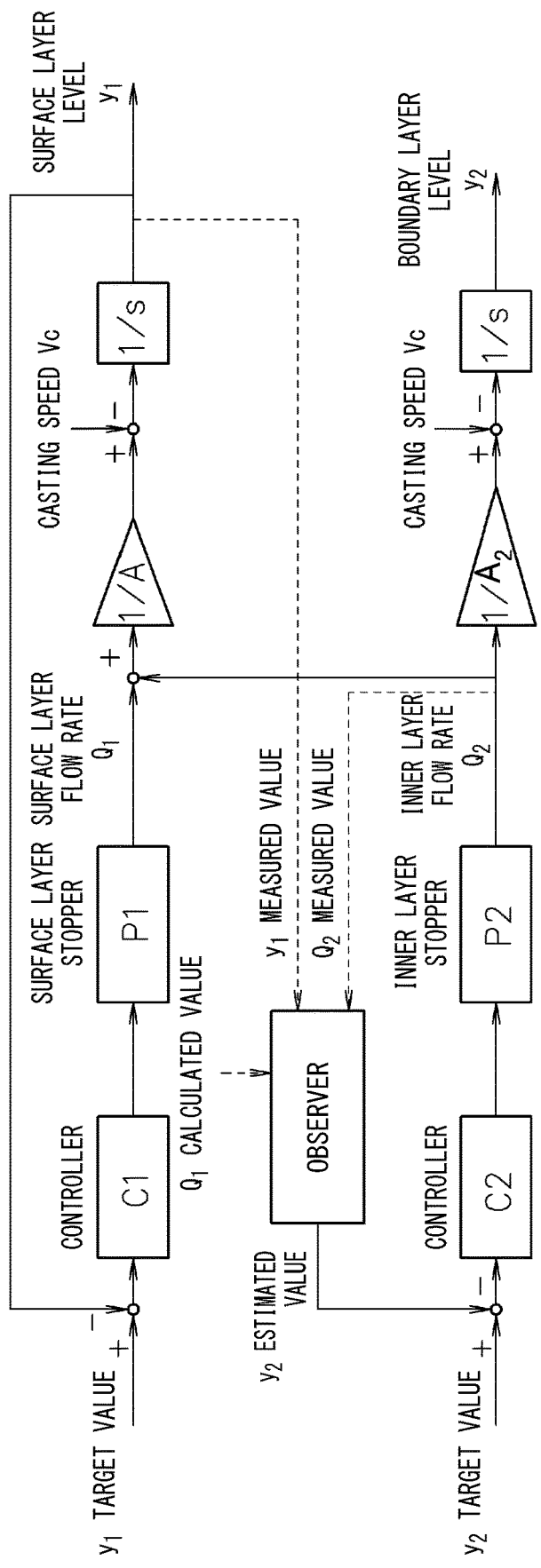
FIG. 3 is a block diagram of a control system of a surface layer flow rate and an inner layer flow rate in the embodiment.

Based on the above description, FIG. 3 illustrates a block diagram of a control system of the surface layer flow rate and the inner layer flow rate in this embodiment.

As illustrated in FIG. 3, the surface layer level $y_1$ is measured and compared with the surface layer level target value ($y_1$ target value), and feedback control is executed to adjust the opening degree of the surface layer stopper 11 according to a difference therebetween under the control of the controller 13. As expressed by equation (1), the fluctuation of the surface layer level $y_1$ is expressed by an equation obtained by dividing the sum of the surface layer flow rate $Q_1$ and the inner layer flow rate $Q_2$ by the area A and then subtracting the casting speed $V_c$ therefrom. According to this, in the block diagram, it is configured such that a value obtained by integrating a value obtained by multiplying $1/A$ by the sum of the surface layer flow rate $Q_1$ controlled according to the opening degree of the surface layer stopper 11 and the inner layer flow rate $Q_2$, then subtracting the casting speed $V_c$ therefrom becomes the surface layer level $y_1$.

The boundary layer level perturbation amount $y_2\tilde{}$ is estimated by the observer, and a value obtained by adding the boundary layer level set value to $y_2\tilde{}$ ($y_2$ estimated value in FIG. 3) and the boundary layer level target value ($y_2$ target value) are compared with each other, and feedback control to adjust the opening degree of the inner layer stopper 12 corresponding to a difference therebetween is executed under the control of the controller 13. The observer estimates the boundary layer level perturbation amount $y_2\tilde{}$ with the measured value of the surface layer level $y_1$, the measured value of the inner layer flow rate $Q_2$, and the calculated value of the surface layer flow rate $Q_1$ as the inputs. As expressed by equation (2), the fluctuation of the boundary layer level $y_2$ is expressed by an equation obtained by dividing the inner layer flow rate $Q_2$ by the inner layer cross-sectional area $A_2$ then subtracting the casting speed $V_c$ therefrom. According to this, in the block diagram, it is configured such that a value obtained by multiplying $1/A_2$ by the inner layer flow rate $Q_2$ controlled according to the opening degree of the inner layer stopper 12 and subtracting the casting speed $V_c$ therefrom to integrate is made the boundary layer level $y_2$.

As described above, the Luenberger-type observer is configured by using the linear approximation model of the continuous casting process of the multilayered slab, and the boundary layer level to be controlled is estimated in real time. As a result, even in a case where the boundary layer level fluctuates due to a change in flow rate characteristic such as nozzle clogging, clogging removal or the like during casting, for example, it is possible to detect the fluctuation in the boundary layer level and rapidly recover the same to the boundary layer level target value. In this manner, in the continuous casting process of the multilayered slab, it is possible to control the boundary layer level with a high degree of accuracy, suppress mixing of the molten metal of the surface layer and the molten metal of the inner layer, and manufacture a multilayered slab with excellent quality.

Since the flowmeter 10 is installed in only one of the surface layer nozzle 1 and the inner layer nozzle 2, an equipment configuration may be made simple.

Note that, even in a case where the flowmeter 10 is installed in the surface layer nozzle 1 and the flowmeter is not installed in the inner layer nozzle 2, the observer may be configured by a similar formulation as expressed by equations (25) to (27). In a state space model in equations (25) and (26) also, the detectability is satisfied, so that the estimation error of the observer configured by equation (27) may asymptotically approach 0.

[Mathematical Expression 11]

$$\frac{d}{dt}\begin{pmatrix}\hat{y}_1(t)\\ \hat{y}_2(t)\\ \hat{d}_2(t)\end{pmatrix} = \begin{pmatrix}0 & 0 & 1/A\\ 0 & -\alpha\beta & 1/A_2^*\\ 0 & 0 & 0\end{pmatrix}\begin{pmatrix}\hat{y}_1(t)\\ \hat{y}_2(t)\\ \hat{d}_2(t)\end{pmatrix} + \begin{pmatrix}1/A & 1/A\\ 0 & 1/A_2^*\\ 0 & 0\end{pmatrix}\begin{pmatrix}\tilde{Q}_1(t)\\ \tilde{Q}_2(t)\end{pmatrix} \quad (25)$$

$$y(t) = \begin{pmatrix}1 & 0 & 0\end{pmatrix}\begin{pmatrix}\hat{y}_1(t)\\ \hat{y}_2(t)\\ \hat{d}_2(t)\end{pmatrix} \quad (26)$$

$$\frac{d}{dt}\begin{pmatrix}\hat{y}_1(t)\\ \hat{y}_2(t)\\ \hat{d}_2(t)\end{pmatrix} =$$

$$\begin{pmatrix}-L_1 & 0 & 1/A\\ -L_2 & -\alpha\beta & 1/A_2^*\\ -L_3 & 0 & 0\end{pmatrix}\begin{pmatrix}\hat{y}_1(t)\\ \hat{y}_2(t)\\ \hat{d}_2(t)\end{pmatrix} + \begin{pmatrix}L_1\\ L_2\\ L_3\end{pmatrix}y(t) + \begin{pmatrix}1/A & 1/A\\ 0 & 1/A_2^*\\ 0 & 0\end{pmatrix}\begin{pmatrix}\tilde{Q}_1(t)\\ \tilde{Q}_2(t)\end{pmatrix} \quad (27)$$

In the formulation of the disturbance, the step disturbance is taken as an example, but in a case where an actual change in flow rate characteristic may be regarded as a ramp shape, ramp disturbance may be assumed. In a case where the ramp disturbance is assumed as the disturbance, disturbance dynamics are formulated as expressed in equation (28).

[Mathematical Expression 12]

$$\frac{d\hat{\xi}_1(t)}{dt} = 0, \quad \frac{d\hat{d}_1(t)}{dt} = \hat{\xi}_1(t) \quad (28)$$

In a case where the flowmeter 10 is installed in the inner layer nozzle 2 and the flowmeter is not installed in the surface layer nozzle 1 as in the embodiment, the formulation of the state space model taking into consideration the ramp disturbance is expressed by equations (29) and (30). Since this state space model also satisfies the detectability, the Luenberger-type observer may be configured as in the case of the step disturbance. Note that, also in a case where the flowmeter 10 is installed in the surface layer nozzle 1 and the flowmeter is not installed in the inner layer nozzle 2, the Luenberger-type observer may be configured by a similar formulation.

[Mathematical Expression 13]

$$\frac{d}{dt}\begin{pmatrix}\hat{y}_1(t)\\ \hat{y}_2(t)\\ \hat{d}_1(t)\\ \hat{\xi}_1(t)\end{pmatrix} = \begin{pmatrix}0 & 0 & \frac{1}{A} & 0\\ 0 & -\alpha\beta & 0 & 0\\ 0 & 0 & 0 & 1\\ 0 & 0 & 0 & 0\end{pmatrix}\begin{pmatrix}\hat{y}_1(t)\\ \hat{y}_2(t)\\ \hat{d}_1(t)\\ \hat{\xi}_1(t)\end{pmatrix} + \begin{pmatrix}1/A & 1/A\\ 0 & 1/A_2^*\\ 0 & 0\\ 0 & 0\end{pmatrix}\begin{pmatrix}\tilde{Q}_1(t)\\ \tilde{Q}_2(t)\end{pmatrix} \quad (29)$$

$$y(t) = \begin{pmatrix}1 & 0 & 0 & 0\end{pmatrix}\begin{pmatrix}\hat{y}_1(t)\\ \hat{y}_2(t)\\ \hat{d}_1(t)\\ \hat{\xi}_1(t)\end{pmatrix} \quad (30)$$

EXAMPLES

In examples to be described below also, a flowmeter 10 is installed in an inner layer nozzle 2 and the flowmeter is not installed in a surface layer nozzle 1 as in the embodiment.

(1) Example 1 (Control Simulation when Flow Rate Characteristic Changes)

In Example 1, casting of a multilayered slab in test continuous casting (CC) was assumed, a control simulation when a flow rate characteristic changes was performed, and a boundary layer level control method to which the present invention is applied was compared with an inner layer flow rate constant control method according to the method disclosed in Patent Document 3 (a method in which a flowmeter is installed in an inner layer nozzle and an inner layer flow rate is kept constant, then a surface layer level is kept constant).

Note that, in the boundary layer level control method, both surface layer level control and boundary layer level control are performed by PI control, and in the inner layer flow rate constant control method, both surface layer level control and inner layer flow rate target value control are performed by PI control.

In this example, a decrease in flow rate of an inner layer stopper due to (1) nozzle clogging, (2) clogging removal, and (3) lowering of a tundish head (lowering of the molten metal level in a tundish) is assumed. As illustrated in (a) of FIG. 4, when the inner layer stopper has a certain opening degree, the flow rate of the inner layer stopper gradually decreases as the tundish head lowers. Then, in the middle of this process, nozzle clogging occurs in the inner layer stopper and the flow rate significantly decreases, and thereafter clogging removal occurs and the decrease in flow rate is solved. Note that, an "inner layer stopper (ST) flow rate characteristic change rate" plotted along the ordinate in (a) of FIG. 4 indicates a relative value of the flow rate characteristic based on the flow rate characteristic of the inner layer stopper when casting is started (relationship between stopper opening degree and flow rate).

Simulation conditions were as follows: mold width: 800 mm, mold thickness: 170 mm, surface layer level target value: −100 mm, boundary layer level target value: −420 mm, casting speed: 1.0 m/min, and solidification constant: 20.0 mm·min ^ (−½)

As PI control parameters of the boundary layer level control method, for both the surface layer level control and the boundary layer level control, a proportional gain was 0.30 and an integration time was 10.0 [sec]. As PI control parameters of the inner layer flow rate constant control method, for the surface layer level control, the proportional gain was 0.30 and the integration time was 10.0 [sec], and for the inner layer flow rate constant control, the proportional gain was 0.000002 and the integration time was 10.0 [sec].

<Result>

Figure 4:
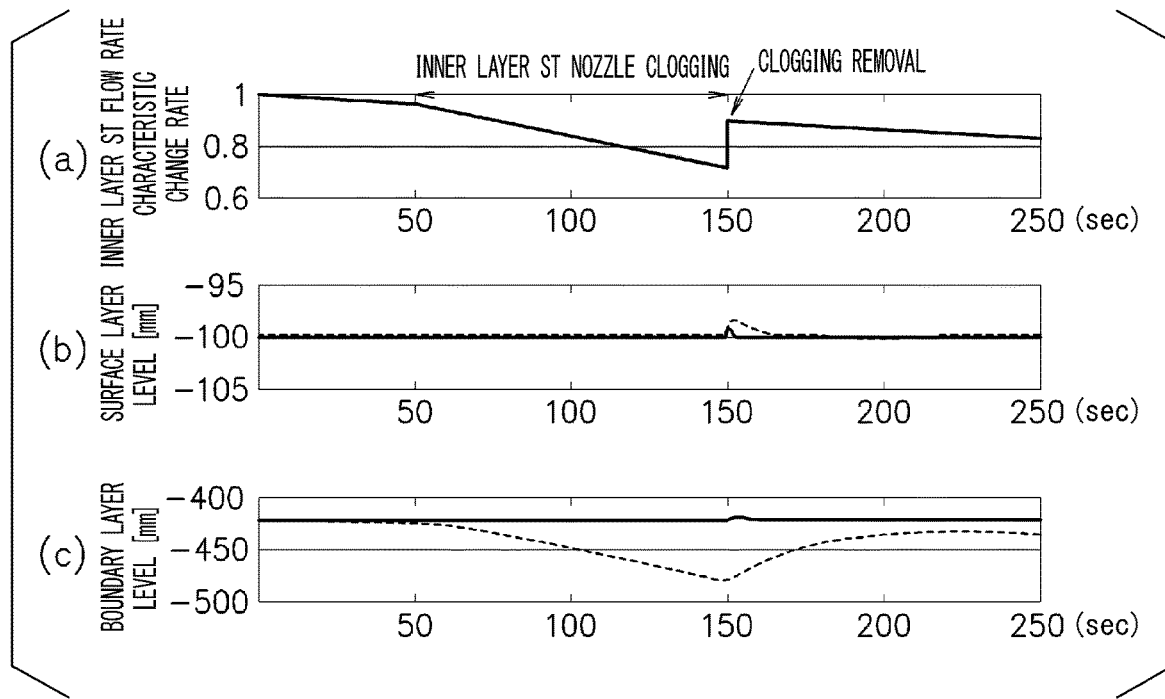
FIG. 4 is a characteristic diagram illustrating a flow rate characteristic of an inner layer stopper, fluctuation in surface layer level, and fluctuation in boundary layer level in Example 1.
Figure 5:
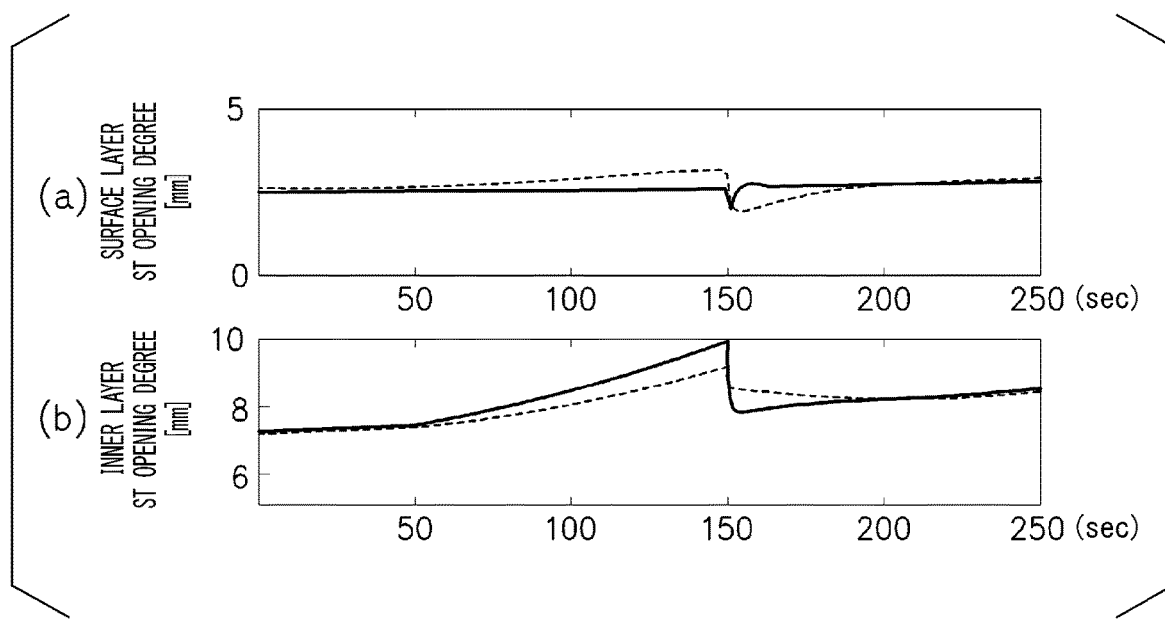
FIG. 5 is a characteristic diagram illustrating a change in opening degree of a surface layer stopper and a change in opening degree of an inner layer stopper in Example 1.
Figure 6:
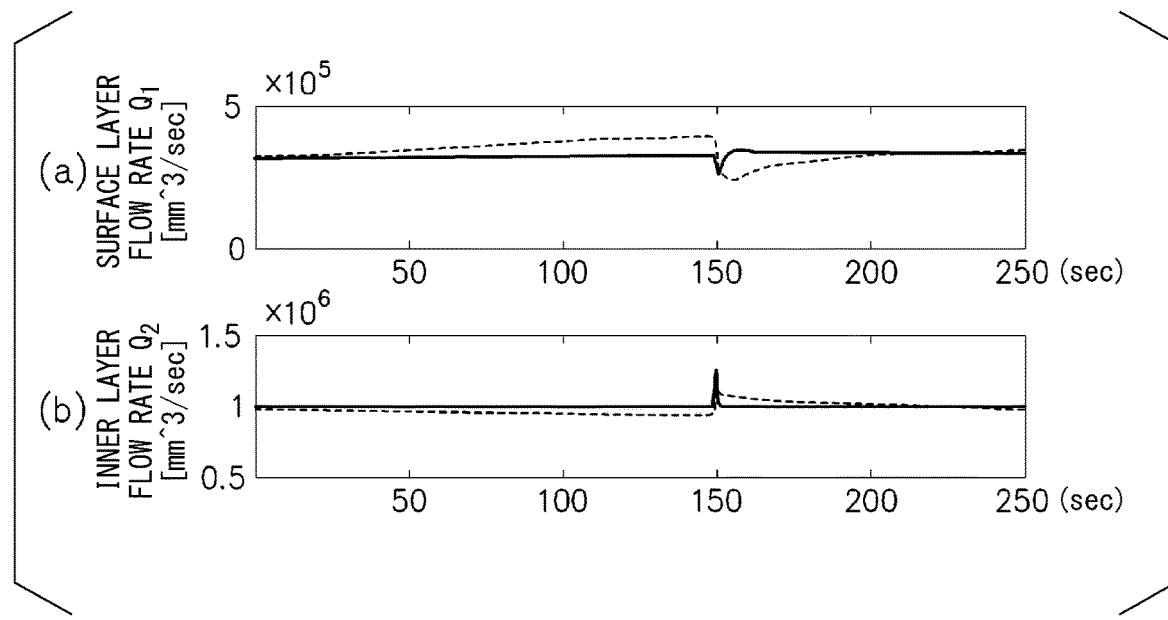
FIG. 6 is a characteristic diagram illustrating changes in surface layer flow rate and changes in inner layer flow rate in Example 1.

(b) of FIG. 4 illustrates fluctuation in the surface layer level, and (c) of FIG. 4 illustrates fluctuation in the boundary layer level. (a) of FIG. 5 illustrates a change in the surface layer stopper opening degree, and (b) of FIG. 5 illustrates a change in the inner layer stopper opening degree. (a) of FIG. 6 illustrates a change in the surface layer flow rate $Q_1$, and (b) of FIG. 6 illustrates a change in the inner layer flow rate $Q_2$. Time [sec] is plotted along the abscissa of each characteristic diagram in FIGS. 4 to 6. A solid line in the drawing indicates a characteristic line by the boundary layer level control method, and a dotted line indicates a characteristic line by the inner layer flow rate constant control method.

With respect to the change in flow rate characteristic of the inner layer stopper in (a) of FIG. 4, regarding the surface layer level, the surface layer level may be kept substantially constant in any method as illustrated in (b) of FIG. 4. In contrast, as illustrated in (c) of FIG. 4, regarding the boundary layer level, the boundary layer level is substantially kept constant in the boundary layer level control method, but the fluctuation in the boundary layer level cannot be suppressed in the inner layer flow rate constant control method.

In the boundary layer level control method, the boundary layer level to be controlled is estimated in real time by an observer, so that it is possible to detect the fluctuation in the boundary layer level and rapidly recover the same to the boundary layer level target value.

In contrast, the inner layer flow rate constant control method is an indirect control method in which a molten steel supply flow rate is recovered to a target value and then the boundary layer level is recovered to the target value by a self-repairing function of a continuous casting process of a multilayered slab in response to the fluctuation in the boundary layer level resulting from a change in the molten steel supply flow rate due to a change in flow rate characteristic of the inner layer stopper, so that it takes a long time to recover the boundary layer level. Note that, in the flow rate target value control, a disturbance suppression effect may be enhanced by making a control gain high such as by shortening an integration time, but a closed loop system might become unstable, so that it is difficult to make the control gain excessively high.

(2) Example 2 (Control Simulation when Changing Casting Speed)

In operation of a continuous casting process, an operation of changing a casting speed $V_c$ is performed during casting. For example, there is a change in casting speed $V_c$ such as an increase in casting speed $V_c$ from a time of molten metal level rising control to steady operation, or a decrease in casting speed $V_c$ in a case where fluctuation in the molten metal level becomes sharp. A control simulation when changing the casting speed $V_c$ was performed while assuming such a situation.

Note that, simulation conditions and control parameters are similar to those in Example 1 except that a tundish head is held constant and the casting speed $V_c$ is changed.

Figure 7:
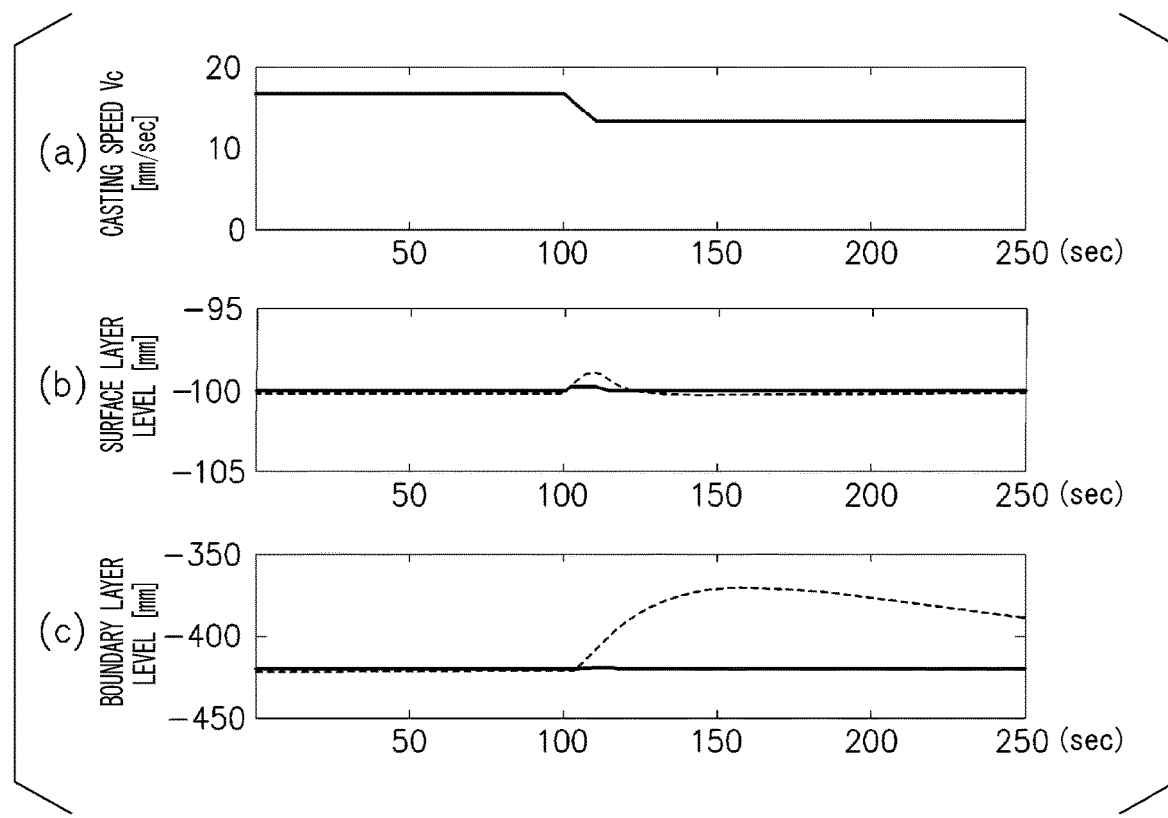
FIG. 7 is a characteristic diagram illustrating a casting speed, fluctuation in surface layer level, and fluctuation in boundary layer level in Example 2.

As illustrated in (a) of FIG. 7, the casting speed $V_c$ was decreased from 16.7 mm/sec (1.0 m/min) to 13.3 mm/sec (0.8 m/min) from 100 sec to 110 sec. Note that, by equations (1) to (4) and (7) expressing a continuous casting process of a multilayered slab, a flow rate target value according to the casting speed $V_c$ was set as the target value in a boundary layer level control method and an inner layer flow rate constant control method.

<Result>

Figure 8:
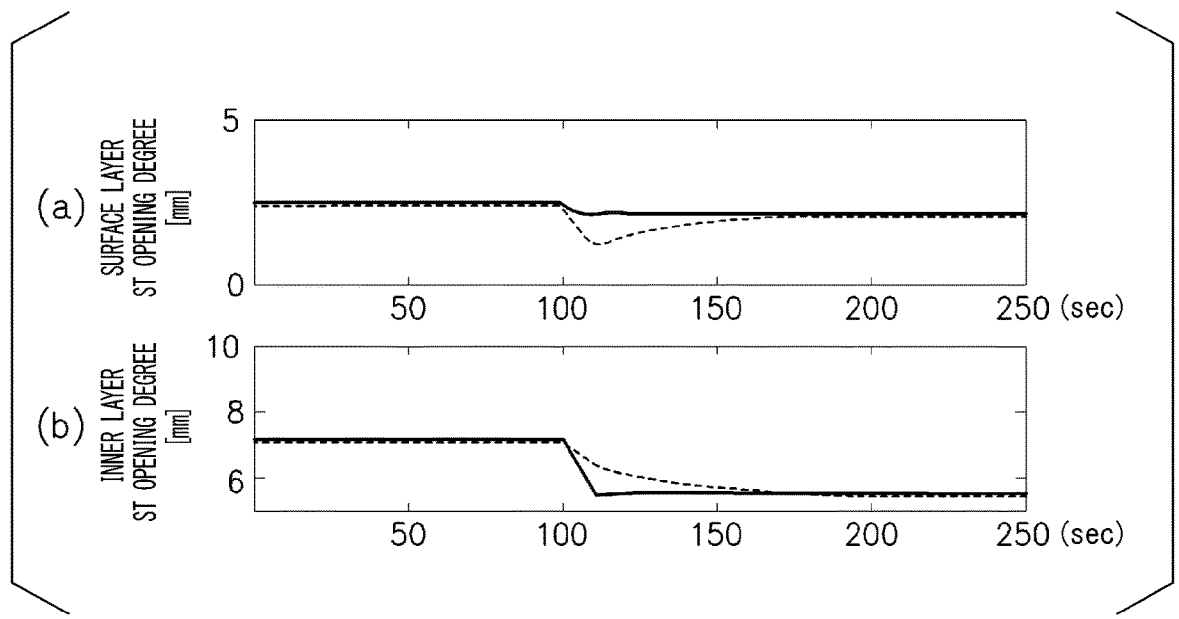
FIG. 8 is a characteristic diagram illustrating a change in opening degree of a surface layer stopper and a change in opening degree of an inner layer stopper in Example 2.
Figure 9:
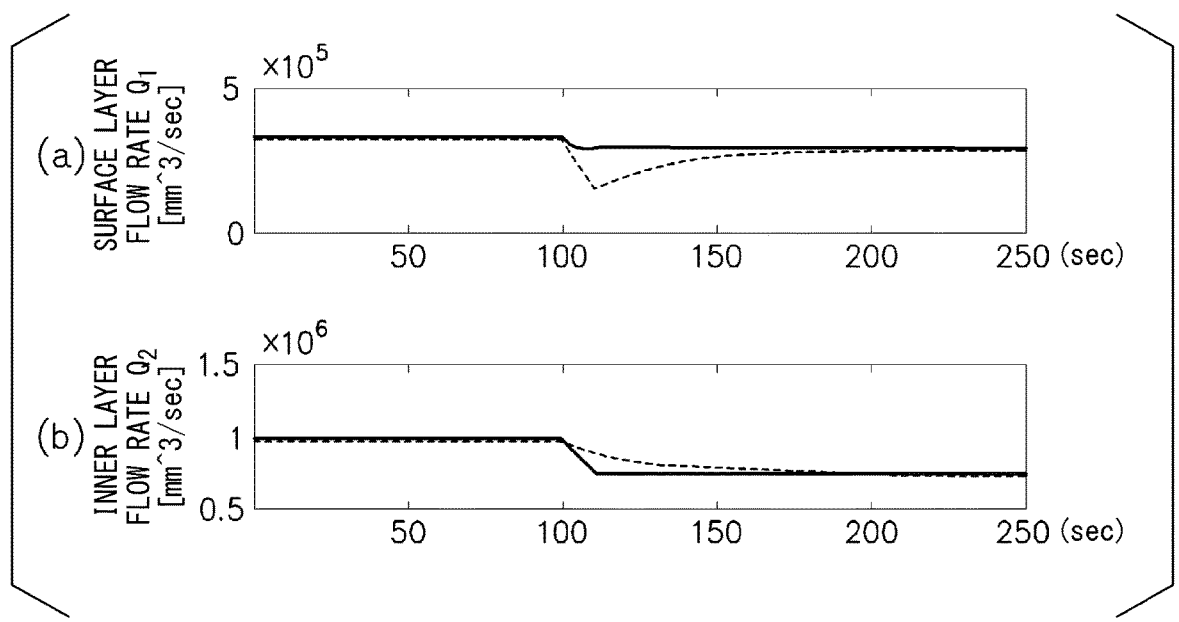
FIG. 9 is a characteristic diagram illustrating changes in surface layer flow rate and changes in inner layer flow rate in Example 2.

(b) of FIG. 7 illustrates fluctuation in the surface layer level, and (c) of FIG. 7 illustrates fluctuation in the boundary layer level. (a) of FIG. 8 illustrates a change in the surface layer stopper opening degree, and (b) of FIG. 8 illustrates a change in the inner layer stopper opening degree. (a) of FIG. 9 illustrates a change in the surface layer flow rate $Q_1$, and (b) of FIG. 9 illustrates a change in the inner layer flow rate $Q_2$. Time [sec] is plotted along the abscissa of each characteristic diagram in FIGS. 7 to 9. A solid line in the drawing indicates a characteristic line by the boundary layer level control method, and a dotted line indicates a characteristic line by the inner layer flow rate constant control method.

With respect to the change in casting speed $V_c$ in (a) of FIG. 7, as illustrated in (b) of FIG. 7, as for the surface layer level, in any method, the fluctuation in the surface layer level may be rapidly suppressed to be converged to a surface layer level target value. On the other hand, as illustrated in (c) of FIG. 7, as for the boundary layer level, the fluctuation in the boundary layer level may be rapidly suppressed in the boundary layer level control method and converged to the boundary layer level target value; however, in the inner layer flow rate constant control method, the fluctuation in the boundary layer level is large and recovery to the boundary layer level target value is delayed.

Although the present invention is described above with the embodiment, the above-described embodiment merely illustrates examples embodying the present invention, and the technical scope of the present invention cannot be construed to be limited by them. That is, the present invention may be implemented in various forms without departing from the technical idea or the main features thereof.

The control device of the continuous casting process of the multilayered slab to which the present invention is applied may be realized by a computer provided with a CPU, a ROM, a RAM and the like, for example.

The present invention may also be realized by supplying software (program) that implements functions of the present invention to a system or a device via a network or various storage media, and allowing a computer of the system or the device to read and execute the program.

Therefore, another aspect of the present invention is a program for controlling a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the program being configured to allow a computer to execute inputting a measured value of a surface layer level that is a position of a molten metal level in the mold by a molten metal level meter, and a measured value of a supply flow rate of the molten metal by a flowmeter installed in any one of the surface layer nozzle and the inner layer nozzle, estimating a boundary layer level that is a position of the boundary by an observer on the basis of the measured value of the surface layer level by the molten metal level meter, the measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed, and controlling the supply flow rate of the molten metal of the surface layer nozzle and the supply flow rate of the molten metal of the inner layer nozzle so as to keep the measured value of the surface layer level by the molten metal level meter and an estimated value of the boundary layer level by the estimation to target values, respectively, or a computer-readable recording medium recording the same.

Note that, the control device of the continuous casting process of the multilayered slab to which the present invention is applied may be a programmable logic controller (PLC), or may be realized by dedicated hardware such as an application specific integrated circuit (ASIC).

FIELD OF INDUSTRIAL APPLICATION

According to the present invention, it becomes possible to suppress mixing of molten metal of a surface layer and molten metal of an inner layer and to manufacture a multilayered slab with excellent quality.

BRIEF DESCRIPTION OF THE REFERENCE SYMBOLS

1 Surface layer nozzle
2 Inner layer nozzle
3 Surface layer tundish
4 Inner layer tundish
5 Mold
6 Magnetic field generation device
7 Boundary
8 Molten metal level
9 Molten metal level meter
10 Flowmeter
11 Surface layer stopper
12 Inner layer stopper
13 Controller
15 Solidification shell position
201 Input unit
202 Control unit
203 Estimation unit
204 Control unit

What is claimed is:

1. A control method of a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the control method of the continuous casting process of the multilayered slab comprising:

using a molten metal level meter that measures a surface layer level that is a position of a molten metal level in the mold, and a flowmeter that measures a supply flow rate of the molten metal installed in any one of the surface layer nozzle and the inner layer nozzle;

estimating a boundary layer level that is a position of the boundary by an observer on the basis of a measured value of the surface layer level by the molten metal level meter, a measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed; and controlling the supply flow rate of the molten metal of the surface layer nozzle and the supply flow rate of the molten metal of the inner layer nozzle so as to keep the measured value of the surface layer level by the molten metal level meter and an estimated value of the boundary layer level by the observer to target values, respectively.

2. The control method of a continuous casting process of a multilayered slab according to claim 1,
wherein a Luenberger-type observer is configured by using a linear approximation model of the continuous casting process of the multilayered slab as the observer.

3. The control method of a continuous casting process of a multilayered slab according to claim 1,
wherein the observer makes the surface layer level, the boundary layer level, and disturbance corresponding to a calculation error of the calculated value of the supply flow rate of the molten metal of one of the surface layer nozzle and the inner layer nozzle in which the flowmeter is not installed state variables.

4. The control method of a continuous casting process of a multilayered slab according to claim 3,
wherein step disturbance or ramp disturbance is given as the disturbance.

5. The control method of a continuous casting process of a multilayered slab according to claim 1,
wherein the flowmeter is installed in the inner layer nozzle.

6. The control method of a continuous casting process of a multilayered slab according to claim 1,
wherein the flowmeter is installed in the surface layer nozzle.

7. A control device that controls a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the control device configured for the continuous casting process of the multilayered slab comprising:

an inputter that inputs a measured value of a surface layer level that is a position of a molten metal level in the mold by a molten metal level meter, and a measured value of a supply flow rate of the molten metal by a flowmeter installed in any one of the surface layer nozzle and the inner layer nozzle;

an estimator that estimates a boundary layer level that is a position of the boundary by an observer on the basis of a measured value of the surface layer level by the molten metal level meter, a measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed; and a controller that controls the supply flow rate of the molten metal of the surface layer nozzle and the supply flow rate of the molten metal of the inner layer nozzle so as to keep the measured value of the surface layer level by the molten metal level meter and an estimated value of the boundary layer level by the estimator to target values, respectively.

8. A non-transitory computer readable medium storing a program for controlling a continuous casting process that injects molten metal from a surface layer nozzle and an inner layer nozzle into a mold and separates the molten metal of a surface layer and the molten metal of an inner layer vertically across a boundary in the mold to manufacture a multilayered slab in which composition of the surface layer and composition of the inner layer are different, the program configured to allow a computer to execute:

inputting a measured value of a surface layer level that is a position of a molten metal level in the mold by a molten metal level meter, and a measured value of a supply flow rate of the molten metal by a flowmeter installed in any one of the surface layer nozzle and the inner layer nozzle;

estimating a boundary layer level that is a position of the boundary by an observer on the basis of the measured value of the surface layer level by the molten metal level meter, the measured value of the supply flow rate of the molten metal of any one of the surface layer nozzle and the inner layer nozzle by the flowmeter, and a calculated value of the supply flow rate of the molten metal of one of the surface layer nozzle and the inner layer nozzle in which the flowmeter is not installed; and controlling the supply flow rate of the molten metal of the surface layer nozzle and the supply flow rate of the molten metal of the inner layer nozzle so as to keep the measured value of the surface layer level by the molten metal level meter and an estimated value of the boundary layer level by the estimating to target values, respectively.

* * * * *